United States Patent [19]

Zaidi

[11] Patent Number: 5,317,531
[45] Date of Patent: May 31, 1994

[54] APPARATUS FOR REDUCING THE SIZE OF AN ARITHMETIC AND LOGIC UNIT NECESSARY TO PRACTICE NON-RESTORE DIVISION

[75] Inventor: Syed A. A. Zaidi, Santa Clara, Calif.

[73] Assignee: Intel Corporation, Santa Clara, Calif.

[21] Appl. No.: 862,348

[22] Filed: Apr. 2, 1992

[51] Int. Cl.$^5$ .............................................. G06F 7/52
[52] U.S. Cl. .................................................. 364/766
[58] Field of Search ................ 364/764, 766, 767, 736

[56] References Cited

U.S. PATENT DOCUMENTS

| 4,381,550 | 4/1983 | Baker | 364/766 |
| 4,785,393 | 11/1988 | Chu et al. | 364/736 |
| 4,891,780 | 1/1990 | Miyoshi | 364/766 |
| 5,016,210 | 5/1991 | Sprague et al. | 364/766 |

OTHER PUBLICATIONS

J. J. F. Cavanagh, "Digital Computer Arithmetic Design and Implementation", pp. 236-259, 1984.

S. Sanyal, "An Algorithm for Non restoring Division", 1977, pp. 124-127.

Primary Examiner—Long T. Nguyen
Attorney, Agent, or Firm—Blakely, Sokoloff, Taylor & Zafman

[57] ABSTRACT

In a circuit for accomplishing arithmetic operations and including an ALU; a first register for holding a dividend to be divided and intermediate and final results of the operation; a second register for holding a divisor; and apparatus for sequentially causing the dividend to be shifted left by one bit and the divisor subtracted from or added to the highest order bits of the dividend and partial remainders to provide a result which determines a quotient bit and thereby practice the operation of non-restore division, the improvement including: apparatus for performing an XNOR operation on the result of any carryout from any addition or subtraction operation and the value of the highest order bit of the dividend or the partial remainder; and apparatus for providing the result of the XNOR operation as the quotient bit to the arithmetic and logic unit.

3 Claims, 4 Drawing Sheets

APPARATUS FOR REDUCING THE SIZE OF AN ARITHMETIC AND LOGIC UNIT NECESSARY TO PRACTICE NON-RESTORE DIVISION

BACKGROUND OF THE INVENTION

1. Field of the Invention

This invention relates to computer apparatus and, more particularly, to improvements in arithmetic and logic units of computer processors by which such units may function utilizing less than the typical number of bit positions.

2. History of the Prior Art

Division conducted by a computer is a relatively slow process compared to other mathematical processes. The basic division process requires that the divisor be progressively subtracted from first a dividend and then sequential new interim dividends until a result is reached. These new interim dividends are realized by first shifting each of the bits of the last dividend by one bit to the next higher bit position leaving an empty position at the lowest order bit position, subtracting the divisor from the highest order bits remaining of the dividend to obtain a partial remainder, and concatenating the partial remainder and the lower order unused bits of the original dividend. After the subtraction, the result of the subtraction is evaluated. If the result is positive, the high order bits of the interim dividend were larger than the divisor, a one is recorded for that place of the quotient and placed in the empty lowest order bit position, and a next shift and subtraction occur. If the result is negative, the divisor was larger than the partial remainder, a zero is recorded for the quotient in the lowest order bit position, and the dividend must be restored to its previous condition by adding back the divisor before the next shift and subtraction. In each step, the process requires a subtraction and may require an addition.

This entire process is quite time consuming so various methods of acceleration have been devised. One of these methods is called non-restore division. In this process, the partial remainder is allowed to be either negative or positive so that the interim dividend value does not have to be restored to its prior-to-subtraction value when a negative number results from the subtraction. The process begins with the same shift of the bits of the dividend to the next highest order bit position and a subtraction from the highest order remaining bits of the dividend. If the partial remainder is positive, a one is recorded in the empty bit position, the bits of the interim dividend are each shifted to the next highest order bit position to provide an empty lowest order bit position, and another subtraction occurs. If the result is negative, a shift still occurs, but the divisor is then added back. Since the shift occurs before the divisor is added back, only half the divisor value previously subtracted is added back so the extra step needed to accomplish a restore does not take place. It will be noted that the shift and add by adding only half the value previously subtracted is equivalent to adding the full divisor, shifting, and then subtracting the divisor since the shift causes the subtracted value to be one-half the added value. In fact, the interim dividend is not explicitly restored unless the result of a subtraction is negative at the last step in the division process. The divisor value is simply added back after the next shift to produce a new interim dividend. This process accomplishes division much more rapidly than the restore process because each step requires either a subtraction or an addition but not both. Both the typical restore and the non-restore processes are explained in detail in Cavanaugh, *Digital Computer Arithmetic*, pp. 236-258.

As may be seen in the Cavanaugh text, the hardware needed to implement the non-restore process of the prior art includes an arithmetic-logic unit (ALU). The ALU used for the operation must be at least one bit larger than the dividend which is to be divided. The carryout from this additional bit position is used to determine the value of the quotient bit for the particular division step and to ascertain what the next operation in the process will be. Thus, if a dividend is a thirty-two bit binary number, a thirty-three bit ALU is required. Similarly, the register holding the partial remainder must be at least one bit longer than the number it is to hold. It has been found that, typically, the greatest number of bit positions required for an ALU used in a computer processor is the number of bits required for the division operation. None of the other operations require the extra number of bit positions which non-restore division has required. Consequently, it is desirable to provide circuitry for accomplishing non-restore division using an ALU which has only the standard number of bits available to other operations. For example, if eight, sixteen, or thirty-two bit dividends are to be divided, then an ALU having the same number of bits as the largest dividend is desirable.

SUMMARY OF THE INVENTION

It is, therefore, an object of the present invention to provide improved apparatus for performing non-restore division by means of a computer processor.

It is another more specific object of the present invention to provide improved apparatus for performing non-restore division by means of a computer processor which utilizes an ALU of convention bit size.

These and other objects of the present invention are realized in a circuit for accomplishing arithmetic operations and including an ALU, a first register for holding a dividend to be divided and intermediate and final results of the operation, a second register for holding a divisor, and apparatus for sequentially causing each of the bits of the dividend and interim dividends to be shifted by one bit to the next highest order bit position and the divisor subtracted from or added to the highest order bits of the dividend and partial remainders to provide a result which determines a quotient bit and thereby practice the operation of non-restore division, the improvement including apparatus for performing an exclusive NOR (XNOR) operation on the result of any carryout from any addition or subtraction operation and the value of the highest order bit of the dividend or the partial remainder; and apparatus for providing the result of the XNOR operation as a quotient bit to the arithmetic and logic unit.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to an apparatus for operating a computer in processing electrical or other (e.g. mechanical, chemical) physical signals to generate other desired physical signals.

DETAILED DESCRIPTION OF THE INVENTION

Figure 1:
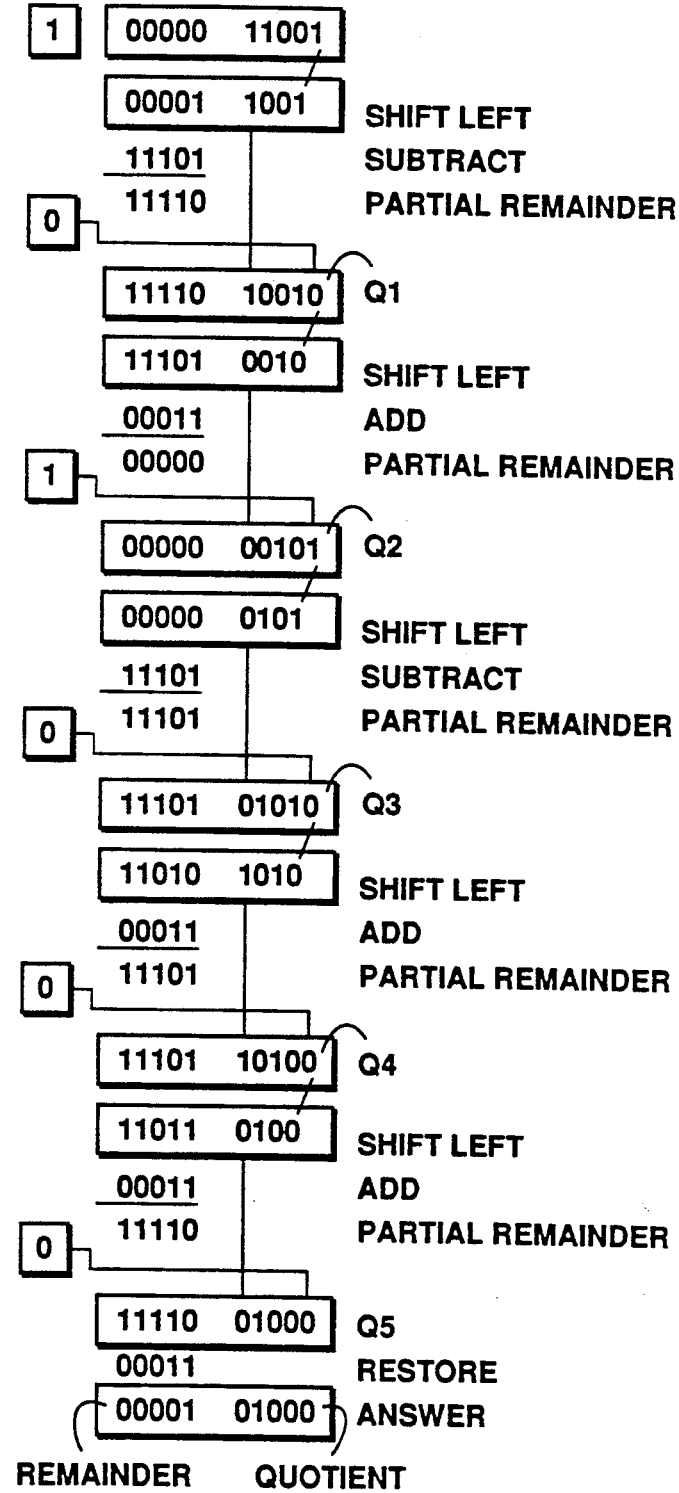
FIG. 1 is a flow chart illustrating the non-restore division method of the prior art.

Referring now to FIG. 1, the flow of data in accomplishing division utilizing the non-restore process described by the above-referenced Cavanaugh text is illustrated. At the top of the Figure to the left is shown the binary representation of the decimal number three which is to be the divisor in the problem. Immediately below the binary representation is the twos complement of the number three; the twos complement is used in subtracting the divisor from the partial product. It will be noted that here as in the Cavanaugh description, a four bit number is represented by five bits. The highest order bit of the dividend stores the sign in division of signed numbers and a zero in division of unsigned numbers. Consequently, the process requires an extra bit position in the divisor.

To the right of the divisor is shown the dividend (the decimal number twenty-five) in binary form. The number is represented by ten bits in the process described, twice the number of bits in the divisor. Typically although not necessarily, the extra bit from the divisor is doubled in the dividend in the manner illustrated. Between the binary representations of the divisor and dividend is shown a carryout value from the highest order bit which results from the operation. This carryout bit determines the next operation to be accomplished and is initially set to one, a value selected to force a subtraction.

In the first step of the division, the bits of the dividend are shifted to the left by one bit position so that each bit is placed in the next highest order bit position. This shifts out the highest order bit; and the divisor is subtracted from the remaining five highest order bits. This subtraction is accomplished by adding the twos complement of the divisor to the five highest order bits of the shifted dividend. Five bits are produced to give a negative result, and there is no carryout.

It should be especially noted that in the arrangement shown by Cavanaugh, shifting out the highest order bit shifts out information held in the sign bit. In unsigned division, no information about the number is contained in this bit so no information is lost in the Cavanaugh process by the shifting operation. Cavanaugh specifically includes this extra bit in the operation so that information in the next order bit is not lost by the shifting operation.

In subtracting using the process of addition of the twos complement of the divisor, either the one in the highest order bit position or the lack of a carryout indicates that the divisor was greater than the partial remainder. Thus, the highest order bits of the dividend are not divisible by the divisor so that the first highest order bit of the quotient must be a zero. This result also indicates that the next operation is to be an addition operation. The first bit of the quotient (a zero determined by lack of a carryout) is placed in the empty lowest order bit position of the next stage interim dividend.

The five bits of the partial remainder produced by the subtraction process are concatenated with the four unused low order bits of the original dividend, and the first quotient bit is placed in the lowest order position. The bits of this concatenated value (the interim dividend) are shifted left by one bit position in the register, and the addition operation indicated by the lack of overflow at the last step is performed. The binary representation of the number three (the divisor) is added to the five highest order bits remaining after the shift. This operation produces a positive result and a carryout bit indicating that the next quotient bit is a one and that the next operation is a subtraction.

Again the five bits of the partial remainder resulting from the addition are concatenated with the four remaining lower order bits to produce a new interim dividend (three from the original dividend and the highest order quotient bit), and the new quotient bit of one is placed in the lowest order position. The bits of the interim dividend are shifted left by one bit, and the subtraction of the divisor (addition of the twos complement of the divisor) is carried out with the five highest order bits of the concatenated number. This operation produces a negative number and no carry out indicating that the next step is an addition and that the next quotient bit is a zero.

The process continues in the same manner through two more steps of the division process until a total of five addition and subtraction steps have occurred, a number of steps equal to the number of bits in the divisor. This produces a final result. However, in order to produce the correct remainder, if the last operation does not produce a positive number and a carryout, the result indicates that the divisor was greater than the number from which it was last subtracted. Then the remainder must be restored by adding back the value of the divisor to the five highest order bits produced. As may be seen, this furnishes a final binary number in which the five highest order bits indicate the value of the remainder (one in this case) and the five lowest order bits indicate the quotient (eight in this case).

This process produces a quotient more rapidly than does the typical restore division process because it requires only an addition or a subtraction at each stage of the division, and not both. As explained above, this occurs because any restore prior to the last step is accomplished implicitly. However, it will be seen that the process requires that the division of what would normally be considered an eight bit value such as twenty-five by what would normally be considered a four bit value such as eight requires an ALU of at least one more bit than the number of bits in the highest valued dividend. If the dividend is thirty-two bits, then an ALU of at least thirty-three bits is required. This extra bit is required in the prior art non-restore operation so that information will not be lost when the data in that position is shifted out during the process.

The requirement for an extra bit is especially inconvenient. First, all of the typical operations practiced by a computer tend to occur in groups equal to half a byte, a byte, or some multiple of a byte. Consequently, such a process typically requires a larger ALU than is necessary for other operations. In fact, all of the operations of the ALU of the processor for which the preferred embodiment of the present invention is designed require no more than thirty-two bits. The construction of a special ALU for the division process is expensive and consumes circuit space. Consequently, the present invention has been devised in order to allow non-restore division to be carried out using a conventionally sized ALU (in the preferred embodiment, one of thirty-two bits).

Figure 2A:
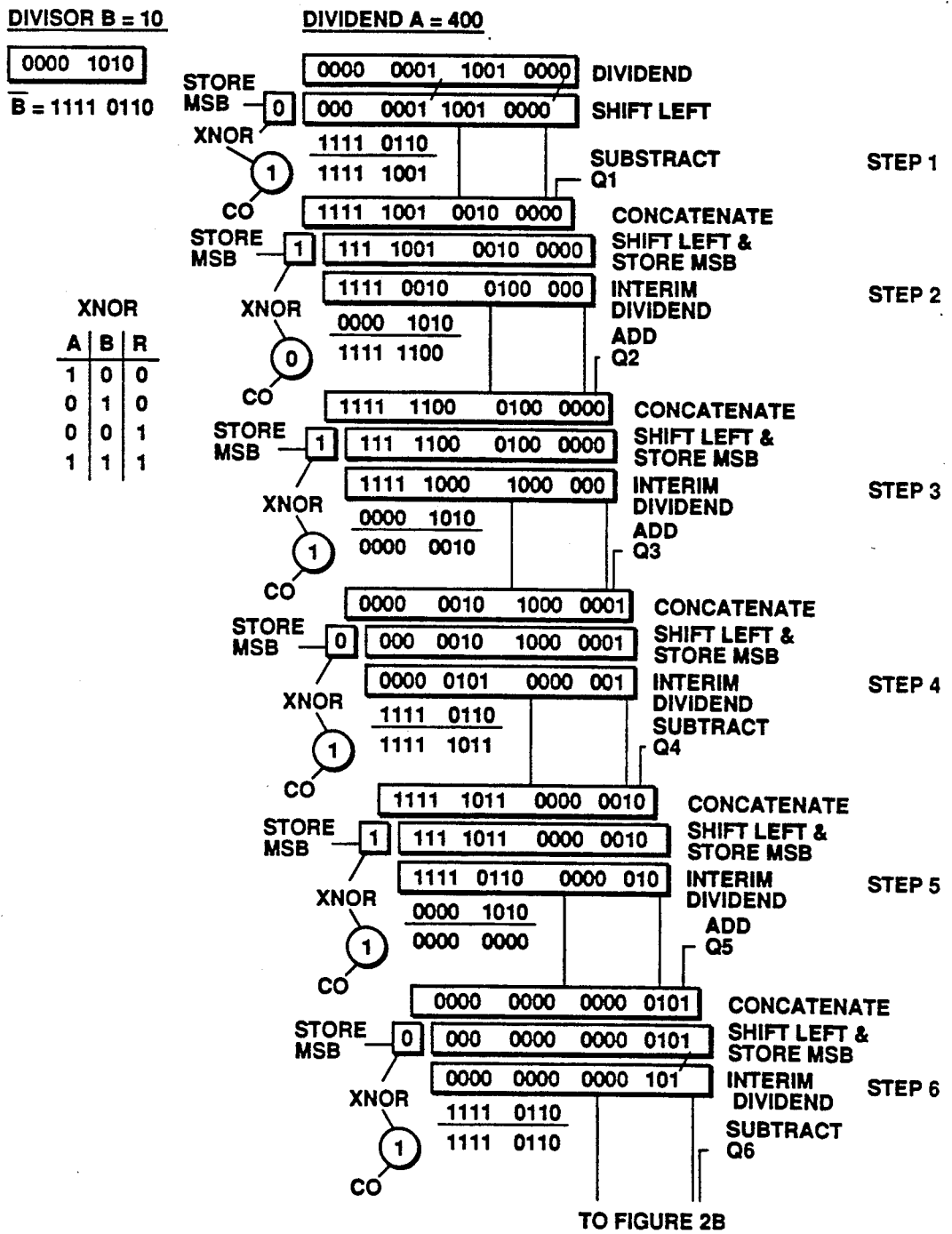
FIGS. 2A and 2B are flow chart diagrams illustrating the non-restore division process carried out by the circuitry of the present invention.
Figure 2B:
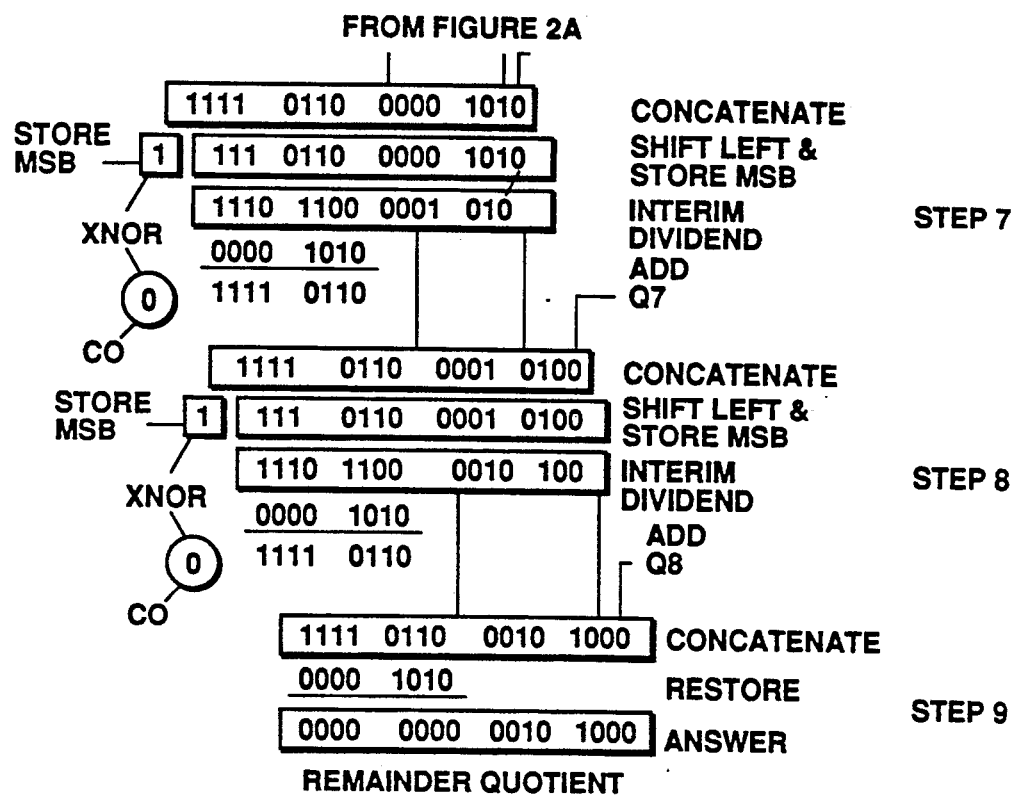

FIGS. 2A and 2B illustrate the operation of non-restore division carried out in accordance with the present invention using an ALU of conventional size. As is illustrated in FIGS. 2A and 2B, a sixteen bit dividend representing the decimal number four hundred is divided by an eight bit divisor representing the number ten. As with the example of the prior art given in FIG. 1, the twos complement of the divisor is utilized to accomplish any subtraction necessary; and this value is illustrated under the binary representation of the divisor in the upper left hand corner of the figure.

In accordance with the present invention, in the first step of the operation, the most significant bit of the dividend is stored apart from the ALU as the first step. Next, each of the bits of the dividend are shifted left by one bit position to the next highest order bit position thereby shifting out the highest order bit; and the divisor is subtracted from the remaining highest order bits of the dividend. This subtraction in the first step of the process is a forced subtraction. The result of this subtraction (the sum of the highest order bits of the dividend which remain after the left shift and the twos complement of the divisor) may produce a carryout value of one or may not produce a carryout value (a zero). It should be noted that the carryout bit produced is inverted in the case of a subtraction which produces a negative number indicating that the divisor is greater than the upper bits of the dividend.

An exclusive NOR (XNOR) operation is carried out using the carryout value and the most significant bit of the dividend stored before the subtraction. The result of the XNOR operation determines the first bit of the quotient and the next operation to be performed. If the XNOR operation produces a one value, this indicates that the quotient is to be a one and that the next operation should be a subtraction. If the XNOR operation produces a zero value, this indicates that the quotient is to be a zero and that the next operation should be an addition.

As may be seen, when this operation is performed with the most significant digit of the dividend and the carryout of the first forced step of the operation in the example, an XNOR result of zero is obtained. Consequently, the divisor is greater than the remaining upper order bits of the dividend, the first quotient bit is a zero, and the next operation to be performed is an addition. The partial remainder which resulted from the first subtraction operation is concatenated with the unused lower order bits of the original dividend to produce the next interim dividend, and the new quotient bit is placed in the empty least significant bit position.

In the second step of the operation, the most significant bit of the interim dividend is again stored apart from the ALU, and the bits of the interim dividend are shifted left by one bit position. Then, the addition operation decided in the last stage is performed by adding the divisor to the highest order bits remaining of the interim dividend. Again, this operation produces a result which may or may not produce a carryout. In this case, no carryout (a zero) is produced. Another XNOR operation is performed using the new carryout bit value and the most significant bit which was stored before the subtraction. This produces a XNOR value indicating that the next operation is to be an addition and that the next quotient bit is a zero. Again, the partial remainder resulting from the addition operation is concatenated with the unused lower order bits of the previous interim dividend; and the new quotient bit is placed in the lowest order bit position to produce the next interim dividend.

In the third step of the operation, the most significant bit of the new interim dividend is again stored, and the interim dividend is shifted left by one bit. Then the addition operation determined in the last stage is performed by adding the divisor to the highest order bits remaining of the remainder. Again, this operation produces a result which may or may not produce a carryout. In the present case, a carryout bit of one is generated. A XNOR operation is then performed using the new carryout value and the most significant bit stored before the subtraction. This produces a XNOR value indicating that the next operation is to be a subtraction and that the next quotient bit is a zero. Again, the results from the addition operation are concatenated with the unused bits of the previous interim dividend; and the new quotient bit is placed in the lowest order bit position to produce the next interim dividend.

In the fourth step of the operation, the most significant bit of the new interim dividend is again stored, and the new remainder is shifted left by one bit. Then, the subtraction operation designated in the last step of the operation is performed by adding the twos complement of the divisor to the highest order bits remaining of the interim dividend. Again, this operation produces a partial remainder result which may or may not produce a carryout. In this case, a carryout of one is produced because the normal carryout value of zero is inverted since the result of the subtraction provides a negative number. A XNOR operation is then performed using the new carryout bit value and the most significant bit stored before the subtraction. This produces a XNOR value of zero indicating that the next operation is to be an addition and the next quotient bit is a zero.

This process continues as described above through four additional iterations, the last of which (step eight) is an addition operation. The partial remainder from this final addition is concatenated with the low order unused bits of the previous interim dividend, and the new quotient bit is placed in the lowest order bit position to produce a result. However, since the last XNOR operation produced a zero indicating that the partial remainder is negative, the dividend must be restored at this point.

Consequently, at step nine, the divisor is added back to the eight highest order bits to produce the final result. In the result, the eight bits to the right represent the quotient, a value of forty, while the eight high order bits represent the remainder, a value of zero. Thus, it may be seen that the process of the present invention produces a correct result for the division of four hundred by ten.

However, the present invention also accomplishes its result more rapidly than does the prior art because only a number of individual add or subtract operations equal to the number of bits in the divisor are necessary whereas in the prior art process, one more such operation than the number of bits in the divisor was necessary. More importantly, the operation of the present invention is accomplished using an ALU which has only a standard number of bit positions. In order to divide a sixteen bit number by a eight bit number, only sixteen bit positions of the ALU need be used. This accomplishes a substantial savings by allowing the use of a standard sized ALU to accomplish the operations rather than requiring a special design with the additional bit position useful only for the non-restore division operation. The use of the XNOR operation preserves the value of the data in the most significant bit position which would otherwise be lost thereby allowing an ALU of a lesser number of bits to be used.

Figure 3:
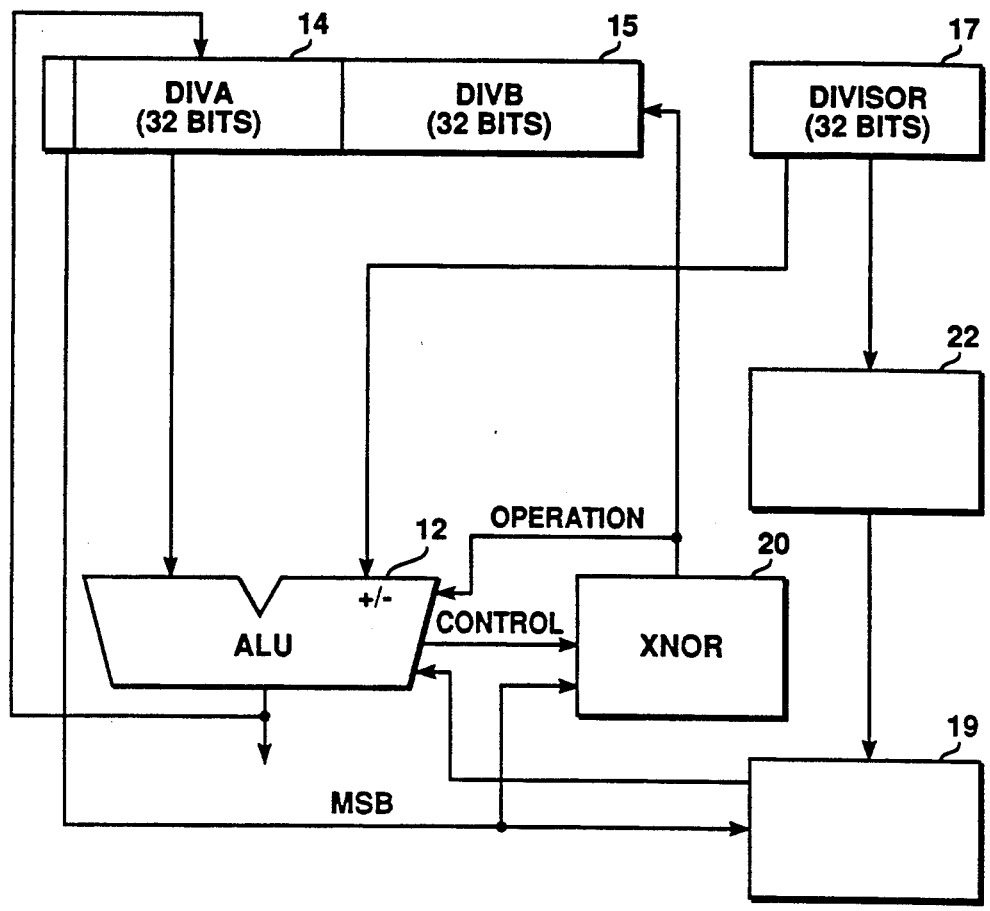
FIG. 3 is a block diagram illustrating apparatus for carrying out the present invention.

FIG. 3 illustrates in block diagram form circuitry which may be utilized to practice the present invention. The circuitry includes a standard ALU 12 which in the preferred embodiment of the invention is an ALU capable of handling thirty-two bits of data. A first register 14 provides a first input to the ALU 12. The register 14 is a thirty-two bit register in the preferred embodiment and holds the upper thirty-two bits of a sixty-four bit binary number which is the dividend. A second register 15 is a thirty-two bit register and holds the lower thirty-two bits of a sixty-four bit binary number which is the dividend. A temporary register 17 which also holds thirty-two bits of data in the preferred embodiment is illustrated for storing the divisor to be utilized in the operation.

A logic circuit 19 is provided to control the ALU 12 to accomplish the subtract operation on the first iteration of the non-restore division operation in response to a division command. The logic circuit 19 then provides the appropriate signals so that the ALU 12 responds to the result of the XNOR operations for all remaining iterations to accomplish non-restore division in accordance with the invention. The operation of the circuit 19 to provide non-restore division of the unsigned values might be accomplished under control of microcode stored in read only memory of a microprocessor of which the ALU 12 and its associated circuitry are a part. The particular microcode is that necessary to accomplish the individual operations described below in order to accomplish each of the steps of the non-restore division process with signed binary numbers. For example, a subtraction operation controlled by the circuit 19 requires that the most significant bit of the value in the DIVA and DIVB registers be stored, that each of the bits of the value in the DIVA and DIVB registers be shifted by one bit to the next greater value, that the value in the register 17 be subtracted from most significant bits of the value in the DIVA and DIVB registers, and that the result be tested for sign and carryout value to determine a quotient bit and a next operation. Each of these steps is a step which may be typically programmed in microcode within a conventional microprocessor.

In a particular microprocessor implemented in accordance with the invention, the instruction for unsigned divide is actually accomplished by a first microcode vector indicating the subtract operation; this accomplishes the initial forced subtract command from the circuit 19. This is followed by a second microcode vector indicating a divide operation. The iterations of the divide operation (shift plus subtract, shift plus add) are performed in hardware by the ALU 12 in response to these vectors. Circuits for accomplishing these operations are well known to those skilled in the art.

Figure 4:
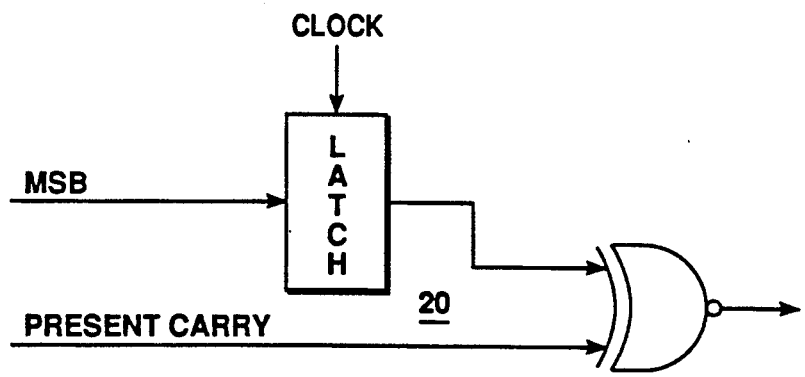
FIG. 4 is a circuit diagram illustrating a portion of the apparatus of FIG. 3.

Also included within the circuitry of FIG. 3 is an XNOR circuit 20 which receives the most significant bit of the dividend at each step of the division operation. The XNOR circuit 20 compares the most significant bit and the carryout from each add or subtract step of the division operation and controls the ALU 12 to accomplish the correct next step in the operation. The XNOR circuit 20 also furnishes the quotient bits as they are generated to the lowest position of the register 15. The XNOR circuit 20 may be constructed in a manner well known to the prior art, for example, as combinational logic adapted to produce the output of an XNOR truth table in response to a pair of input values. Such a circuit 20 is illustrated, for example, in FIG. 4. An iteration counter 22 is utilized to determine the number of steps of the operation which have been accomplished during the division operation.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for accomplishing arithmetic operations comprising:
   an arithmetic and logic unit (ALU);
   a first register for holding a dividend to be divided, the first register being connected to furnish input to the ALU and to receive intermediate and final results of a division operation from the ALU;
   a second register for holding a divisor, the second register being connected to furnish input to the ALU;
   a single bit register having an input connected to store a most significant bit of a dividend stored in the first register;
   a logic circuit controlling the operation of the ALU to perform non-restore division operations in sequential steps in which bits of the dividend are cyclically shifted by one bit position toward the most significant bit position; and an exclusive NOR (XNOR) circuit having a first input from the single bit register and a second input from a carryout bit of the ALU,
an output of the XNOR circuit being connected during division operations to furnish input to a lowest order bit of the first register and to the ALU to control the next sequential operation thereof.

2. A circuit for accomplishing arithmetic operations comprising:
an arithmetic and logic unit (ALU);
a first register for holding a dividend to be divided and intermediate and final results of a division operation;
a second register for holding a divisor;
a logic circuit for controlling the ALU to practice the operation of non-restore division by sequentially causing bits of the dividend to be shifted by one bit toward the highest order bit position and the divisor to be subtracted from or added to the highest order bits of the dividend and interim dividends in order to sequentially subtract and add the dividend and the divisor,
a third register for storing apart from the arithmetic and logic unit a value of a highest order bit of a dividend in the first register; and
an exclusive NOR (XNOR) circuit connected to receive as input values a carryout of any operation of the ALU and the value of the highest order bit of the dividend stored in the third register;
an output of the XNOR circuit being connected to provide input during a division operation to the least significant bit position of the first register and to provide a signal to control the particular sequential operation performed by the ALU.

3. A circuit for carrying out division of binary numbers in which an unsigned dividend is of a maximum bit length, comprising:

an arithmetic and logic unit (ALU) having a number of bit positions equal to a maximum bit length of an unsigned dividend,
a dividend register having a number of bit positions equal to the maximum bit length of an unsigned dividend, the dividend register being connected to provide input to the ALU and to receive output therefrom,
a divisor register connected to provide input to the ALU and having a number of bit position equal to one-half the maximum bit length of an unsigned dividend,
a logic circuit for controlling the ALU to divide a dividend by a divisor utilizing a non-restore process having a number of iterations each of which includes a shift toward the highest order bit and either a subtraction or an addition of the divisor from the highest order bits remaining,
a counter circuit for controlling the number of iterations of the logic circuit during a division operation,
a most significant bit register positioned apart from the ALU and connected to receive a highest order bit held by the dividend register, and
a logical exclusive NOR (XNOR) circuit connected to receive as input a value stored in the most significant bit register and any carryout value from a subtraction or addition iteration of a division operation,
the XNOR circuit being connected to provide an output signal to the ALU to control the next step of a division operation to be a subtraction if the output is a one value or an addition if the output is a zero value,
the XNOR circuit being connected to provide an output signal to a lowest bit position of the dividend register during each step of a division operation.

* * * * *